US012748087B2

(12) United States Patent
Fukushima

(10) Patent No.: US 12,748,087 B2
(45) Date of Patent: Sep. 29, 2026

(54) GAS CHROMATOGRAPH ASSISTANCE DEVICE AND GAS CHROMATOGRAPH ASSISTANCE METHOD

(71) Applicant: Shimadzu Corporation, Kyoto (JP)

(72) Inventor: Daiki Fukushima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 384 days.

(21) Appl. No.: 18/378,558

(22) Filed: Oct. 10, 2023

(65) Prior Publication Data

US 2024/0125746 A1 Apr. 18, 2024

(30) Foreign Application Priority Data

Oct. 18, 2022 (JP) ................................ 2022-167197

(51) Int. Cl.
*G01N 30/88* (2006.01)
*G01N 30/02* (2006.01)

(52) U.S. Cl.
CPC ....... *G01N 30/88* (2013.01); *G01N 2030/025* (2013.01)

(58) Field of Classification Search
CPC ... G01N 30/88; G01N 2030/025; G01N 30/02
See application file for complete search history.

(56) References Cited

U.S. PATENT DOCUMENTS

| | | | | |
|---|---|---|---|---|
| 6,217,829 | B1 * | 4/2001 | Mustacich | G01N 30/30 422/89 |
| 2011/0100093 | A1 | 5/2011 | Kawana | |
| 2014/0250978 | A1 * | 9/2014 | McCauley | G01N 30/26 73/23.39 |
| 2017/0146500 | A1 * | 5/2017 | Kanazawa | G01N 30/88 |
| 2017/0356890 | A1 * | 12/2017 | Saito | G01N 30/54 |
| 2019/0086372 | A1 * | 3/2019 | Sakamoto | G01N 27/623 |

FOREIGN PATENT DOCUMENTS

| | | | |
|---|---|---|---|
| CN | 105358972 | A | 2/2016 |
| JP | 2011-095072 | A | 5/2011 |
| JP | 2011-220909 | A | 11/2011 |

OTHER PUBLICATIONS

Office Action dated May 15, 2026, in the counterpart Chinese patent application CN 202311346195.0.

* cited by examiner

*Primary Examiner* — Ricky Go
(74) *Attorney, Agent, or Firm* — Muir Patent Law, PLLC

(57) ABSTRACT

A GC assistance device includes a saving amount evaluator, a consumption amount evaluator and an outputter, and is used together with a gas chromatograph. The saving amount evaluator evaluates a saving amount of a resource caused by stopping of the gas chromatograph. The consumption amount evaluator evaluates a consumption amount of the resource caused by recovery of the gas chromatograph from a stop state. The outputter presents an evaluation value in regard to the saving amount and the consumption amount to a user. Alternatively, the outputter controls an operation state of the gas chromatograph based on the evaluation value.

13 Claims, 11 Drawing Sheets

FIG. 2

| | WORK START POINT IN TIME | WORK FINISH POINT IN TIME |
|---|---|---|
| MONDAYS | 9:00 | 18:00 |
| TUESDAYS | 9:00 | 18:00 |
| WEDNESDAYS | 9:00 | 18:00 |
| THURSDAYS | 9:00 | 18:00 |
| FRIDAYS | 9:00 | 18:00 |
| SATURDAYS | — | — |
| SUNDAYS | — | — |

FIG. 3

| DETECTOR | RECOVERY PERIOD OF TIME | GAS CONSUMPTION AMOUNT | | POWER CONSUMPTION AMOUNT | |
|---|---|---|---|---|---|
| | | DURING WAITING | DURING RECOVERY | DURING WAITING | DURING RECOVERY |
| FID | 30 [MINUTES] | A1 [L] | A2 [L] | A3 [W] | A4 [W] |
| TCD | 60 [MINUTES] | B1 [L] | B2 [L] | B3 [W] | B4 [W] |
| FPD | 3 [HOURS] | C1 [L] | C2 [L] | C3 [W] | C4 [W] |
| ECD | 4 [HOURS] | D1 [L] | D2 [L] | D3 [W] | D4 [W] |
| BID | 1 [DAY (S) ] | E1 [L] | E2 [L] | E3 [W] | E4 [W] |
| FTD | 1 [DAY (S) ] | F1 [L] | F2 [L] | F3 [W] | F4 [W] |
| PDD | 2 [DAY (S) ] | G1 [L] | G2 [L] | G3 [W] | G4 [W] |
| | X | Y | Z | Y | Z |

F I G. 4

| COLUMN OVEN | RECOVERY PERIOD OF TIME | POWER CONSUMPTION AMOUNT | |
|---|---|---|---|
| | | DURING WAITING | DURING RECOVERY |
| MODEL NUMBER H | H1 [MINUTES] | H2 [W] | H3 [W] |
| MODEL NUMBER I | I1 [MINUTES] | I2 [W] | I3 [W] |
| MODEL NUMBER J | J1 [MINUTES] | J2 [W] | J3 [W] |
| | X | Y | Z |

GAS CHROMATOGRAPH ASSISTANCE DEVICE AND GAS CHROMATOGRAPH ASSISTANCE METHOD

BACKGROUND

Technical Field

The present invention relates to a gas chromatograph assistance device and a gas chromatograph assistance method.

Description of Related Art

Gas chromatographs have been known as analysis devices that separate a substance included in a sample into different components. In a gas chromatograph, a sample that is to be analyzed and has been vaporized in a sample vaporization chamber is introduced into a separation column together with a carrier gas. The sample that has been introduced into the separation column is separated into compounds and detected by a detector. A gas chromatogram is produced based on a detection signal provided by the detector.

A gas chromatograph may be provided with a function for reducing the consumption amount of a resource such as gas or power. For example, a gas chromatograph device described in JP 2011-95072 A is provided with an energy saving mode. After an analysis ends, the user instructs execution of the energy saving mode during a waiting period until a next analysis is performed. Thus, it is possible to reduce the amount of a carrier gas to be used and the power consumption amount without causing damage to the gas chromatograph device.

SUMMARY

In recent years, it has been required to more sufficiently reduce the resource consumption amount in a gas chromatograph. Here, it is possible to reduce the resource consumption amount by turning off the power supply during a period in which the gas chromatograph is not used. However, since a large amount of resource is consumed at the time of startup of the gas chromatograph after the power supply is turned on, it may rather increase the resource consumption amount by turning off the power supply. Therefore, it is not easy for the user to determine whether to turn off the power supply.

An object of the present invention is to provide a gas chromatograph assistance device and a gas chromatograph assistance method that enable reduction of a resource consumption amount in a gas chromatograph.

One aspect of the present invention relates to a gas chromatograph assistance device that is used together with a gas chromatograph, and includes a saving amount evaluator that evaluates a saving amount of a resource caused by stopping of the gas chromatograph, a consumption amount evaluator that evaluates a consumption amount of the resource caused by recovery of the gas chromatograph from a stop state, and an outputter that presents an evaluation value in regard to the saving amount and the consumption amount to a user or controls an operation state of the gas chromatograph based on the evaluation value.

Another aspect of the present invention relates to a gas chromatograph assistance method, of assisting use of a gas chromatograph, which is performed by a computer, that includes evaluating a saving amount of a resource caused by stopping of the gas chromatograph, evaluating a consumption amount of the resource caused by recovery of the gas chromatograph from a stop state, and presenting an evaluation value in regard to the saving amount and the consumption amount to a user or controlling an operation state of the gas chromatograph based on the evaluation value.

With the present invention, it is possible to reduce a resource consumption amount in a gas chromatograph.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 2 is a diagram showing one example of schedule information;

FIG. 3 is a diagram showing one example of specification information;

FIG. 4 is a diagram showing another example of the specification information;

DETAILED DESCRIPTION

1. First Embodiment

(1) Configuration of Analysis System

Figure 1:
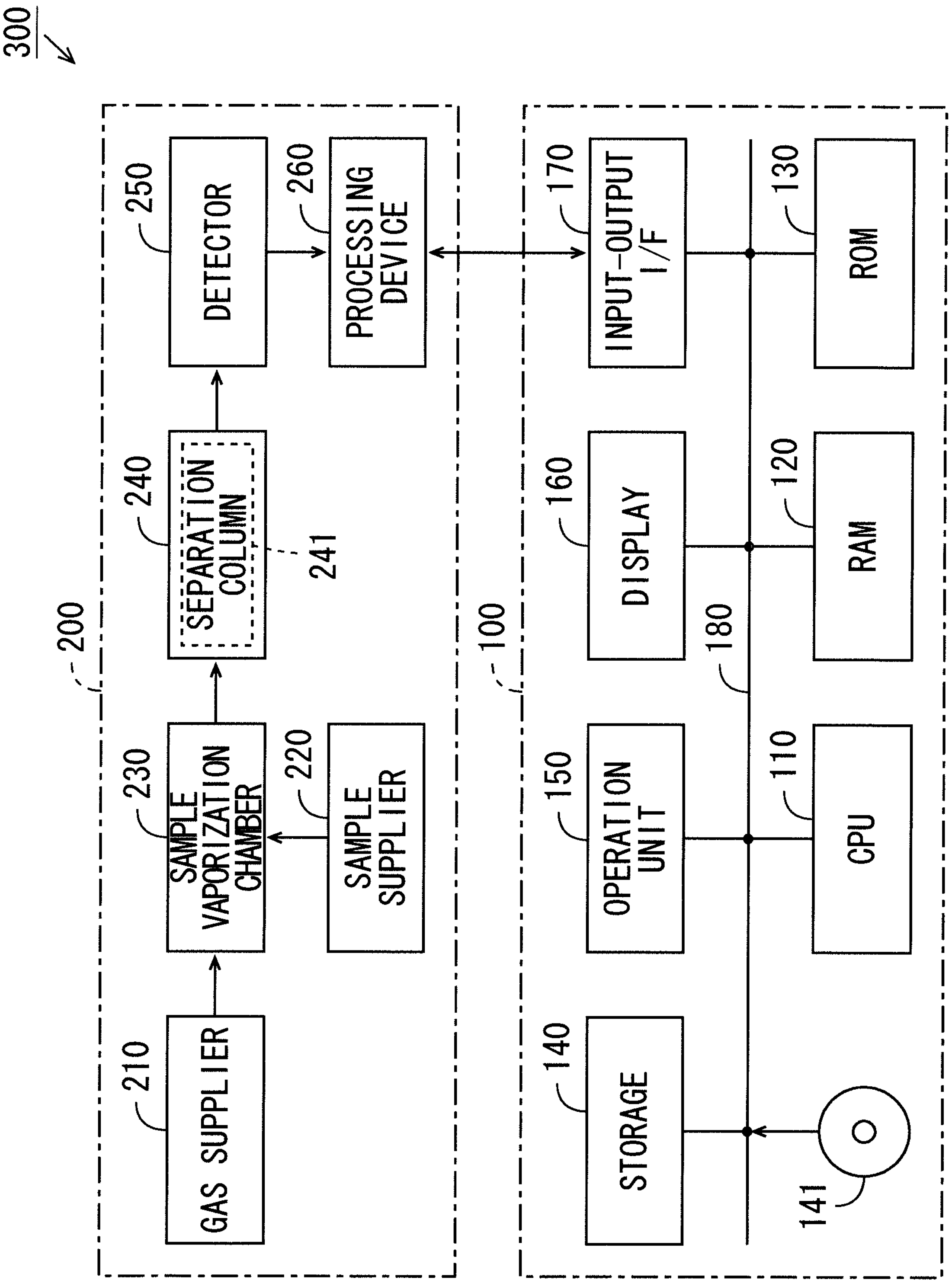
FIG. 1 is a diagram showing the configuration of an analysis system including a GC assistance device according to a first embodiment of the present invention.

A gas chromatograph (GC) assistance device and a GC assistance method according to embodiments of the present invention will be described below in detail with reference to the drawings. FIG. 1 is a diagram showing the configuration of an analysis system including a GC assistance device according to a first embodiment of the present invention. As shown in FIG. 1, the analysis system 300 includes the GC assistance device 100 and a GC 200. The analysis system 300 may include a plurality of GCs 200.

The GC assistance device 100 includes a CPU (Central Processing Unit) 110, a RAM (Random Access Memory) 120, a ROM (Read Only Memory) 130, a storage 140, an operation unit 150, a display 160, an input-output I/F (interface) 170 and a bus 180. The CPU 110, the RAM 120, the ROM 130, the storage 140, the operation unit 150, the display 160 and the input-output I/F 170 are connected to the bus 180. The GC assistance device 100 may be realized by a personal computer, for example.

The RAM 120 is used as a work area for the CPU 110. A system program is stored in the ROM 130. The storage 140 includes a storage medium such as a hard disc or a semiconductor memory, and stores various types of information used in a GC assistance process, described below. Further, the storage 140 stores a GC assistance program. The CPU 110 executes the GC assistance program stored in the storage 140 on the RAM 120, so that the GC assistance process is executed.

Instead of the storage 140, the GC assistance program may be stored in a computer-readable external storage medium 141 such as a compact disc (CD)-ROM or a Universal Serial Bus (USB) memory. Alternatively, the GC assistance program may be provided in the form of being stored in the external storage medium 141 and installed in the storage 140.

The operation unit 150 is an input device such as a keyboard, a mouse or a touch panel. The display 160 is a display device such as a liquid crystal display device. A user can make various designation with respect to the CPU 110 using the operation unit 150. The display 160 can display a result of process executed by the CPU 110. The input-output I/F 170 is connected to a processing device 260, described below, of the GC 200.

The GC 200 includes a plurality of constituent elements. A unique identifier for specifying a constituent element is provided to each of the plurality of constituent elements. In the example of FIG. 1, the constituent elements of the GC 200 are a gas supplier 210, a sample supplier 220, a sample vaporization chamber 230, a column oven 240, a detector 250 and a processing device 260.

The gas supplier 210 includes a gas cylinder, a pump, a flow-rate adjustment valve and a flow-path switching valve, for example. The gas supplier 210 supplies a carrier gas to the sample vaporization chamber 230 or the detector 250. A carrier gas may be an inert gas such as a helium gas, or may be a hydrogen gas.

The sample supplier 220 includes an autosampler or an auto-injector, for example. A predetermined amount of sample is sucked from a container containing a liquid sample to be analyzed, and the sucked sample is supplied to the sample vaporization chamber 230. The sample to be analyzed may be subjected to predetermined pre-processing. The sample supplied by the sample supplier 220 is vaporized in the sample vaporization chamber 230. The vaporized sample is introduced into a separation column 241 of the column oven 240 together with the carrier gas supplied by the gas supplier 210.

The column oven 240 contains the separation column 241 and maintains the separation column 241 at a predetermined constant temperature. The separation column 241 separates a sample that has been introduced from the sample vaporization chamber 230 into components according to differences in chemical property or composition. The detector 250 detects the components into which the sample is separated by the separation column 241 and outputs a detection signal corresponding to a detection intensity to the processing device 260.

The processing device 260 includes a CPU, a RAM, a ROM and a memory, for example. The processing device 260 controls the operation of each constituent element of the GC 200. Further, the processing device 260 processes a detection signal output by the detector 250 to produce a gas chromatogram representing the relationship between the retention time of each component in the separation column 241 and the detection intensity. The GC assistance device 100 may include part of the processing device 260.

(2) Schedule Information and Specification Information

The GC 200 has three operation states: an analysis state, a waiting state and a stop state. In the analysis state, the above-mentioned analysis of a sample is performed. In the waiting state, although the power supply is turned on, the consumption amount of a resource (a carrier gas or power in the present example) is maintained lower than that in the analysis state. In the stop state, the power supply is turned off. Therefore, the resource is hardly consumed.

In the present embodiment, the GC assistance device 100 assists the use of the GC 200 by performing the GC assistance process such that a resource consumed by the GC 200 is reduced. The storage 140 of the GC assistance device 100 stores schedule information and specification information as information used in the GC assistance process. The schedule information and the specification information may be stored not in the storage 140 but in another storage device.

The schedule information represents the work schedule of the user of the GC 200. FIG. 2 is a diagram showing one example of schedule information. As shown in FIG. 2, on weekdays, the work start point in time of the user is 9:00 and the work finish point in time of the user is 18:00. On the other hand, the user does not work on weekends or public holidays.

The specification information represents the specifications of various devices that are usable as the constituent elements of the GC 200. The specifications mainly include a recovery period of time and a resource consumption amount per unit time. The specification may further include other information such as an identifier, dimensions or operating temperature of a device. The recovery period of time is a period of time from the time when the device is started to the time when the device is operable with certain stability.

The resource consumption amount is an amount of a resource to be consumed in the device. The resource consumption amount includes a resource consumption amount per unit time during waiting and a resource consumption amount per unit time during recovery. The resource consumption amount per unit time during waiting is an amount of a resource to be consumed per unit time in the device in a case in which the GC 200 is in the waiting state. The resource consumption amount per unit time during recovery is an amount of a resource to be consumed per unit time in the device in the recovery period of time.

The resource consumption amount may further include a resource consumption amount per unit time during an analysis. The resource consumption amount per unit time during an analysis is an amount of a resource to be consumed per unit time in the device in a case in which the GC 200 is in the analysis state. Basically, the resource consumption amount per unit time during recovery and the resource consumption amount per unit time during an analysis are larger than the resource consumption amount per unit time during waiting.

FIG. 3 is a diagram showing one example of specification information. In the example of FIG. 3, the specification information of various detectors that are usable as the detector 250 of the GC 200 is shown. Specification information represents the recovery period of time, the gas consumption amount per unit time and the power consumption amount per unit time, of a detector.

As shown in FIG. 3, the recovery period of time of an FID (Flame Ionization Detector) or a TCD (Thermal Conductivity Detector) is relatively short. The recovery period of time of an FPD (Flame Photometric Detector) or an ECD (Electron Capture Detector) is relatively long. The recovery period of time of a BID (Dielectric-Barrier Discharge Ionization Detector), an FTD (alkaline Flame Thermionic Detector) or a PDD (Pulsed Discharge Photo-Ionization Detector) is extremely long.

A recovery period of time shown in FIG. 3 is one example, and the recovery period of time varies depending on the stability or maintenance state required for a detector. For example, in a case in which high stability is required for a detector, the recovery period of time gets longer. On the other hand, in a case in which high stability is not required for a detector, the recovery period of time gets shorter. Therefore, in the specification information, a plurality of recovery periods of time may be respectively represented in correspondence with a plurality of degrees of stability of a detector. Further, in the specification information, a plurality of recovery periods of time may be respectively represented in correspondence with a plurality of maintenance states.

FIG. 4 is a diagram showing another example of the specification information. In the example of FIG. 4, the specification information of various column ovens usable as the column oven 240 of the GC 200 is shown. Specification information represents the recovery period of time and the power consumption amount per unit time, of a column oven. In regard to a column oven, basically, the larger the volume, the longer the recovery period of time and the larger the power consumption amount.

Further, in regard to a column oven, the larger the set temperature, the longer the recovery period of time and the larger the power consumption amount. Therefore, in the specification information, a plurality of recovery periods of time may be represented or a plurality of power consumption amounts may be represented in correspondence with a plurality of set temperatures of a column oven.

(3) GC Assistance Device

Figure 5:
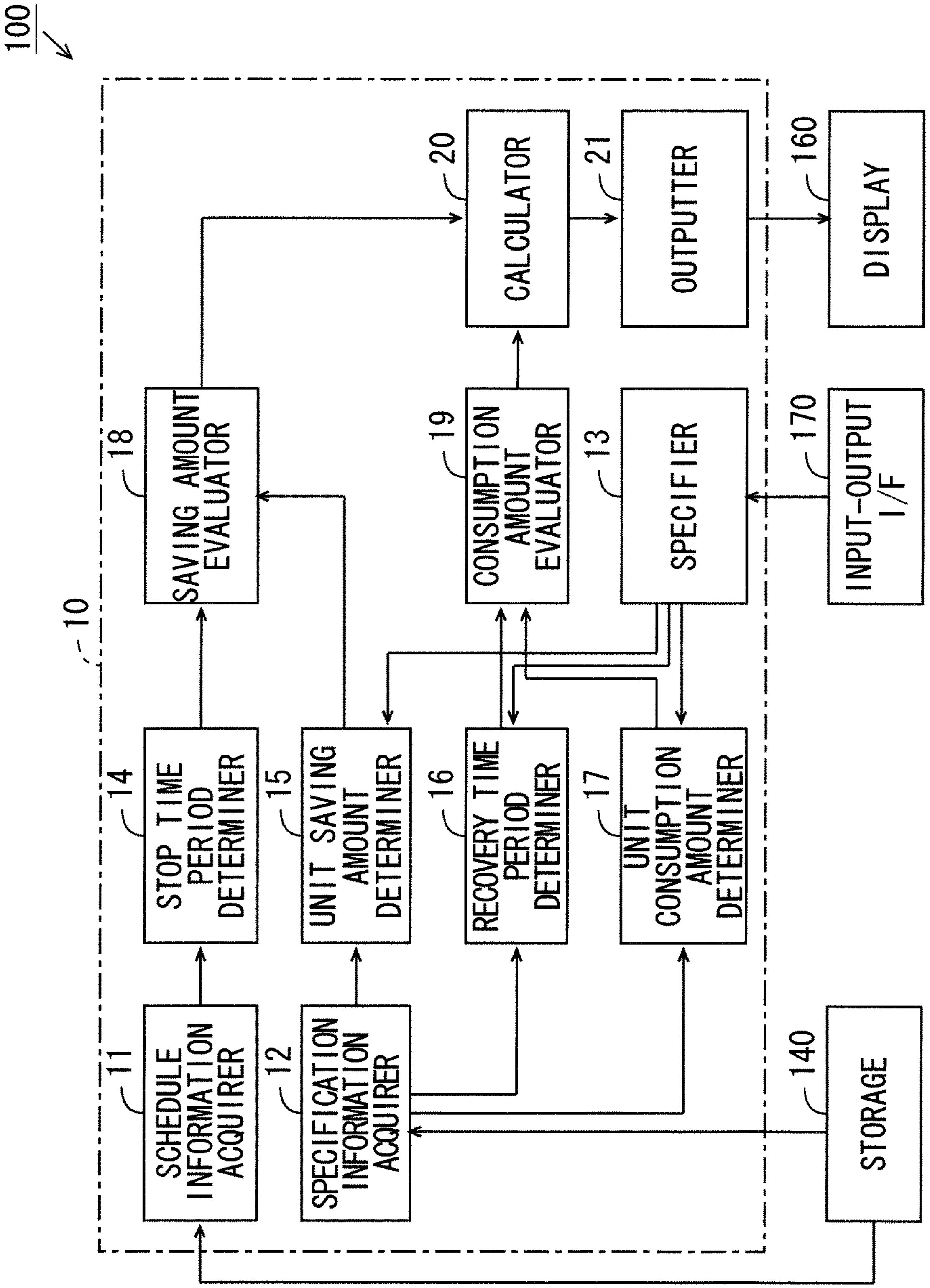
FIG. 5 is a diagram showing the configuration of functions of the GC assistance device of FIG. 1.

FIG. 5 is a diagram showing the configuration of functions of the GC assistance device 100 of FIG. 1. As shown in FIG. 5, the GC assistance device 100 includes, as the functions 10, a schedule information acquirer 11, a specification information acquirer 12, a specifier 13, a stop time period determiner 14, a unit saving amount determiner 15, a recovery time period determiner 16, a unit consumption amount determiner 17, a saving amount evaluator 18, a consumption amount evaluator 19, a calculator 20 and an outputter 21. The functions 10 are implemented by execution of the GC assistance program stored in the storage 140 or the like by the CPU 110 of FIG. 1. Part or all of the functions 10 may be implemented by hardware such as an electronic circuit.

The schedule information acquirer 11 acquires schedule information stored in the storage 140 or the like. The specification information acquirer 12 acquires specification information stored in the storage 140 or the like. The specifier 13 acquires an identifier assigned to each constituent element from the GC 200 via the input-output I/F 170. The specifier 13 specifies a constituent element included in the GC 200 based on the acquired identifier.

The stop time period determiner 14 determines a period of time which is predicted as a period of time in which the GC 200 can be in the stop state as a predicted stop period of time. In the present example, a predicted stop period of time is determined based on schedule information acquired by the schedule information acquirer 11. For example, a point in time later than the work finish point in time of the user may be determined as the start point in time of a predicted stop period of time, and a point in time earlier than the work start point in time of the next work day of the user may be determined as the finish point in time of the predicted stop period of time.

The unit saving amount determiner 15 determines the resource saving amount per unit time in the GC 200 as a unit saving amount. In a case in which the GC 200 is in the waiting state, the amount of resource shown in the column Y of FIG. 3 or 4 is consumed per unit time in regard to each of the constituent elements included in the GC 200. Therefore, it is possible to save the same amount of resource by bringing the GC 200 into the stop state.

As such, in the present example, a unit saving amount is determined based on specification information acquired by the specification information acquirer 12 and a constituent element specified by the specifier 13. Specifically, in the specification information acquired by the specification information acquirer 12, the value in the column Y corresponding to the constituent element specified by the specifier 13 is determined. The sum of the values in column Y determined in regard to all of the constituent elements included in the GC 200 is a unit saving amount.

The recovery time period determiner 16 determines a period of time which is predicted to be required for the GC 200 to become operable with certain stability after the GC 200 is started as a predicted recovery period of time. In the present example, a predicted recovery period of time is determined based on specification information acquired by the specification information acquirer 12 and a constituent element specified by the specifier 13. Specifically, in the specification information acquired by the specification information acquirer 12, the value in the column X (see FIG. 3 or 4) corresponding to the constituent element specified by the specifier 13 is determined. Among the values in the column X determined in regard to all of the constituent elements included in the GC 200, the largest value is a predicted recovery period of time.

The unit consumption amount determiner 17 determines a resource consumption amount per unit time in the GC 200 as a unit consumption amount. In the present example, a unit consumption amount is determined based on specification information acquired by the specification information acquirer 12 and a constituent element specified by the specifier 13. Specifically, in the specification information acquired by the specification information acquirer 12, the value in the column Z corresponding to the constituent element specified by the specifier 13 is determined. The sum of the values in the column Z determined in regard to all of the constituent elements included in the GC 200 is a unit consumption amount.

The saving amount evaluator 18 evaluates a resource saving amount caused when the GC 200 is brought into the stop state. A saving amount is evaluated based on the product of a predicted stop period of time determined by the stop time period determiner 14 and a unit saving amount determined by the unit saving amount determiner 15. The consumption amount evaluator 19 evaluates a resource consumption amount caused by recovery of the GC 200 from the stop state. A consumption amount is evaluated based on the product of a predicted recovery period of time determined by the recovery time period determiner 16 and a unit consumption amount determined by the unit consumption amount determiner 17.

The calculator 20 calculates the result of comparison between a saving amount evaluated by the saving amount evaluator 18 and a consumption amount evaluated by the consumption amount evaluator 19 as an evaluation value. The result of comparison may be provided by subtraction of a consumption amount from a saving amount or division of a consumption amount by a saving amount. An evaluation value is calculated for each of gas and power. Further, a predetermined threshold value is provided in regard to an evaluation value for each of gas and power. In a case in which an evaluation value is equal to or larger than a threshold value, it is possible to save a resource by bringing the GC 200 into the stop state. On the other hand, in a case in which an evaluation value is smaller than the threshold value, it is possible to save a resource by not bringing the GC 200 into the stop state.

The outputter 21 presents an evaluation value calculated by the calculator 20 to the user. In the present example, the outputter 21 presents an evaluation value to the user by displaying the evaluation value on the display 160. By identifying the evaluation value presented by the outputter 21, the user can easily determine whether a resource is saved when the GC 200 is brought into the stop state.

(4) Predicted Stop Period of Time and Predicted Recovery Period of Time

Figure 6:
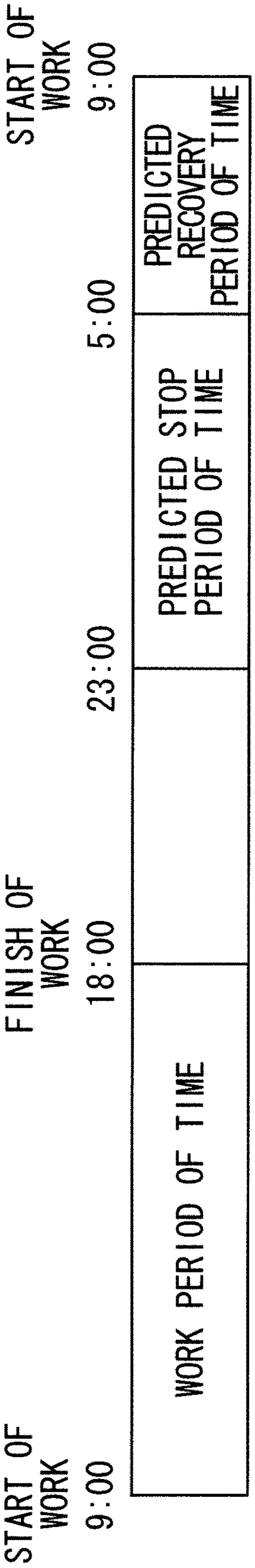
FIG. 6 is a diagram showing one example of a predicted stop period of time and a predicted recovery period of time.

FIG. 6 is a diagram showing one example of a predicted stop period of time and a predicted recovery period of time. In the present example, the predicted stop period of time is determined based on schedule information. According to the schedule information of FIG. 2, the work start point in time of the user is 9:00 and the work finish point in time of the user is 18:00, on weekdays. Therefore, as shown in FIG. 6, on weekdays, 23:00 that is five hours after 18:00, which is the work finish point in time of the user, is determined as the start point in time of the predicted stop period of time.

In this manner, the start point in time of the predicted stop period of time may be sufficiently later than the work finish point in time of the user. In this case, after the user finishes work, the GC 200 is kept operable for a certain period of time. Therefore, the user can finish work with an analysis that requires a relatively long period of time (a continuous batch analysis, for example) started by the GC 200.

A point in time earlier than 9:00, which is the work start time of the user on the next work day, is determined as the finish point in time of the predicted stop period of time. Therefore, in a case in which the start point in time of the predicted stop period of time is on Friday, the finish point in time of the predicted stop period of time is on Monday of the next week. The finish point in time of the predicted stop period of time may be determined further based on the specification information acquired by the specification information acquirer 12 and the constituent element specified by the specifier 13.

For example, as described above, the predicted recovery period of time of the GC 200 is determined by the recovery time period determiner 16 based on the specification information and the constituent element. As such, a point in time that is earlier than the work start point in time of the user on the next work day by the predicted recovery period of time may be determined as the finish point in time of the predicted stop period of time. In this case, the predicted stop period of time can be determined more accurately. In the present example, as described below, the predicted recovery period of time is determined to be four hours. Therefore, 5:00 that is four hours earlier than 9:00, which is the work start point in time of the user is determined as the finish point in time of the predicted stop period of time.

The predicted recovery period of time is determined based on the specification information and the constituent element. As described above, the constituent elements of the GC 200 of FIG. 1 are the gas supplier 210, the sample supplier 220, the sample vaporization chamber 230, the column oven 240, the detector 250 and the processing device 260. Based on the specification information of each of the constituent elements, the longest recovery period of time among the recovery periods of time of these constituent elements is determined as a predicted recovery period of time of the GC 200.

In the present example, an ECD is used as the detector 250 of the GC 200. In this case, the recovery period of time of the detector 250 is the longest among the recovery periods of time of the constituent elements of the GC 200. As shown in FIG. 3, the recovery period of time of the ECD is 4 hours. Therefore, the predicted recovery period of time of the GC 200 is determined to be 4 hours.

In a case in which the user determines that the resource consumption amount is reduced when the GC 200 is brought into the stop state, the user selects to bring the GC 200 into the stop state. In this case, the GC 200 is brought into the stop state at 23:00, which is the start point in time of the predicted stop period of time, by the timer function, for example. The GC 200 is started at 5:00 that is four hours earlier than 9:00, which is the work start point in time of the user, and is recovered by the work start point in time of the user. Thus, even in a case in which the resource consumption amount during recovery is large, the resource consumption amount can be reduced.

On the other hand, in a case in which the user determines that the resource consumption amount is rather increased when the GC 200 is brought into the stop state, the user selects not to bring the GC 200 into the stop state but to bring the GC 200 into the waiting state. In this case, the GC 200 is brought into the waiting state at 23:00, which is the start point in time of the predicted stop period of time, by the timer function, for example. Thus, the resource consumption amount can be reduced.

(5) GC Assistance Process

Figure 7:
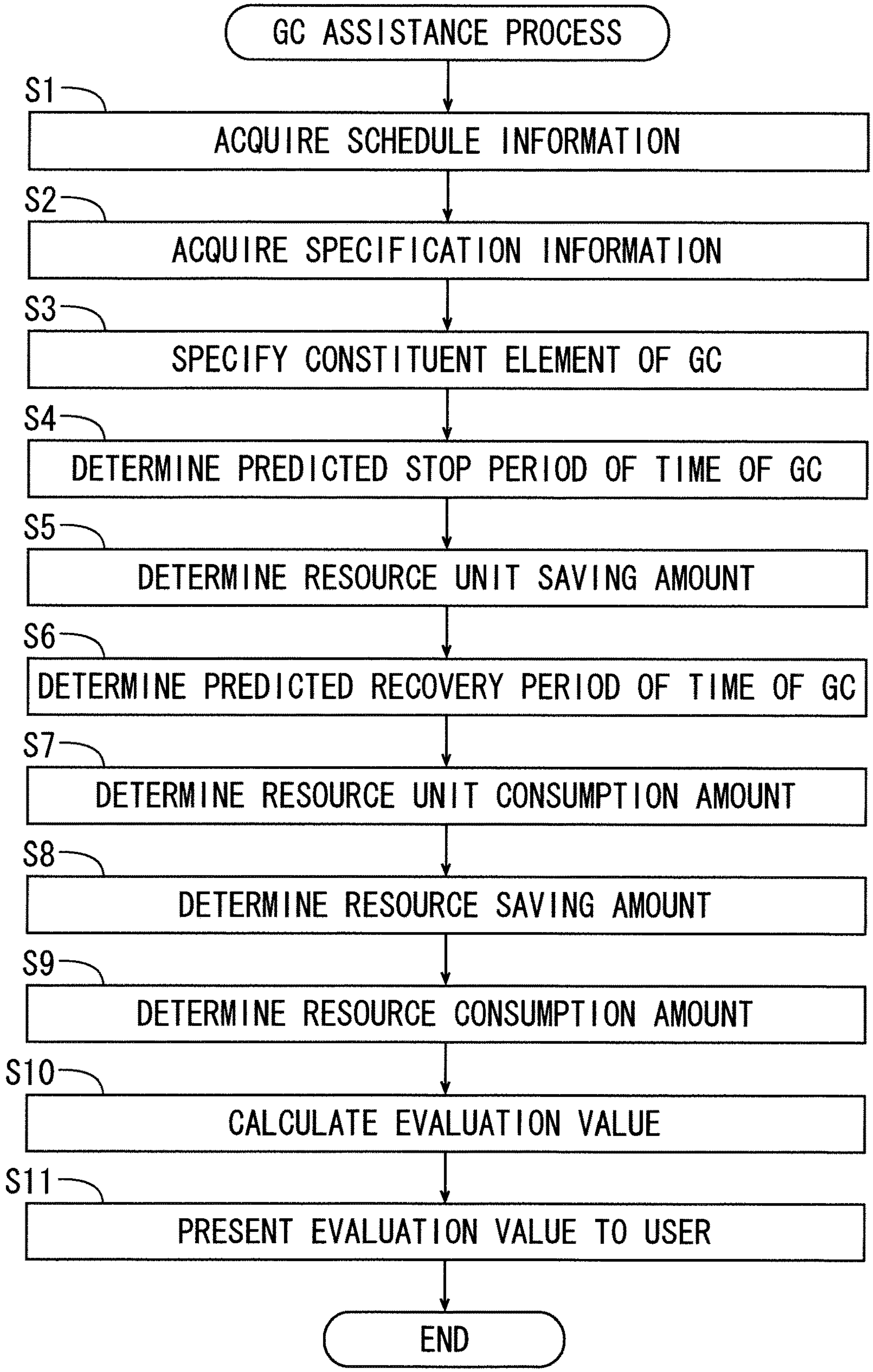
FIG. 7 is a flowchart showing one example of the algorithm of a GC assistance process executed by the GC assistance device based on a GC assistance program.

FIG. 7 is a flowchart showing one example of the algorithm of the GC assistance process executed by the GC assistance device 100 based on the GC assistance program. The GC assistance process will be described below with reference to the GC assistance device 100 of FIG. 5 and the flowchart of FIG. 7.

First, the schedule information acquirer 11 acquires schedule information (step S1). The specification information acquirer 12 acquires specification information (step S2). The specifier 13 specifies a constituent element of the GC 200 (step S3). Any one of the steps S1 to S3 may be performed first, or the steps S1 to S3 may be performed at the same time.

Next, the stop time period determiner 14 determines a predicted stop period of time of the GC 200 based on the schedule information acquired in the step S1 (step S4). The unit saving amount determiner 15 determines a resource unit saving amount in the GC 200 based on the specification information acquired in the step S2 and the constituent element specified in the step S3 (step S5).

Further, the recovery time period determiner 16 determines a predicted recovery period of time of the GC 200 based on the schedule information acquired in the step S1 (step S6). Based on the schedule information acquired in the step S1, the unit consumption amount determiner 17 determines a resource unit consumption amount in the GC 200 (step S7).

Any one of the steps S4 to S7 may be performed first, or the steps S4 to S7 may be performed at the same time. In particular, the step S4 may be performed earlier than the steps S2 and S3 as long as being performed later than the step S1. On the other hand, the steps S5 to S7 may be performed earlier than the step S1 as long as being performed later than the steps S2 and S3.

Subsequently, the saving amount evaluator 18 evaluates a resource saving amount based on the predicted stop period of time of the GC 200 determined in the step S4 and the resource unit saving amount determined in the step S5 (step S8). The consumption amount evaluator 19 evaluates a resource consumption amount based on the predicted recovery period of time of the GC 200 determined in the step S6 and the resource unit consumption amount determined in the step S7 (step S9).

Either one of the steps S8 and to S9 may be performed first, or the steps S8 and S9 may be performed at the same time. In particular, the step S8 may be performed earlier than the steps S6 and S7 as long as being performed later than the steps S4 and S5. On the other hand, the step S9 may be performed earlier than the steps S4 and S5 as long as being performed later than the steps S6 and S7.

Thereafter, the calculator 20 calculates an evaluation value relating to the resource saving amount evaluated in the step S8 and the resource consumption amount evaluated in the step S9 (step S10). In the present example, the evaluation value is the result of comparison between the resource saving amount and the resource consumption amount. Finally, the outputter 21 presents the evaluation value calculated in the step S10 to the user (step S11) and ends the GC assistance process.

(6) Effects

In the GC assistance device 100 according to the present embodiment, the resource saving amount caused by stopping of the GC 200 is evaluated by the saving amount evaluator 18. The resource consumption amount caused by recovery of the GC 200 from the stop state is evaluated by the consumption amount evaluator 19. The evaluation value relating to the saving amount and the consumption amount is presented to the user by the outputter 21.

With this configuration, the user can easily determine whether the resource is to be saved when the GC 200 is brought into the stop state by identifying the evaluation value presented by the outputter 21. Thus, the resource consumption amount in the GC 200 can be reduced.

The evaluation value is calculated by the calculator 20 as a result of comparison between the saving amount and the consumption amount. In this case, an increase or decrease in resource consumption amount caused by stopping of the GC 200 is indicated by the evaluation value. Thus, it is possible to more easily determine whether the resource is to be saved by stopping of the GC 200.

The resource saving amount caused by stopping of the GC 200 is evaluated based on the predicted stop period of time determined by the stop time period determiner 14 and the unit saving amount determined by the unit saving amount determiner 15. The resource consumption amount caused by recovery of the GC 200 from the stop state is evaluated based on the predicted recovery period of time determined by the recovery time period determiner 16 and the unit consumption amount determined by the unit consumption amount determiner 17. In these cases, the resource saving amount and the resource consumption amount can be easily evaluated.

The predicted stop period of time is determined based on the schedule information acquired by the schedule information acquirer 11. In this case, the predicted stop period of time can be easily determined based on the user's schedule. Further, the predicted stop period of time may be determined based on the constituent element that is included in the GC 200 and specified by the specifier 13 and the specification information that represents the specification of the constituent element and is acquired by the specification information acquirer 12. In this case, the predicted stop period of time can be more accurately determined based on the specification of the constituent element included in the GC 200.

The predicted recovery period of time, the unit saving amount and the unit consumption amount are determined based on the constituent element that is included in the GC 200 and specified by the specifier 13 and the specification information that represents the specification of the constituent element and is acquired by the specification information acquirer 12. In this case, based on the specification of the constituent element included in the GC 200, the unit saving amount, the unit consumption amount and the predicted recovery period of time can be determined.

(7) Modified Examples

In the present embodiment, the resource saving amount and the resource consumption amount are evaluated in regard to each of gas and power. Therefore, the evaluation value is calculated for each of gas and power, and the calculated evaluation value is presented to the user. Here, the evaluation value for gas may not match the evaluation value for power.

For example, although the evaluation value for gas is equal to or larger than a threshold value, the evaluation value for power may be smaller than the threshold value. In this case, when the GC 200 is brought into the stop state, although the gas consumption amount is reduced, the power consumption amount is increased. Alternatively, although the evaluation value for power is equal to or larger than the threshold value, the evaluation value for gas may be smaller than the threshold value. In this case, when the GC 200 is brought into the stop state, although the power consumption amount is reduced, the gas consumption amount is increased.

Figure 8:
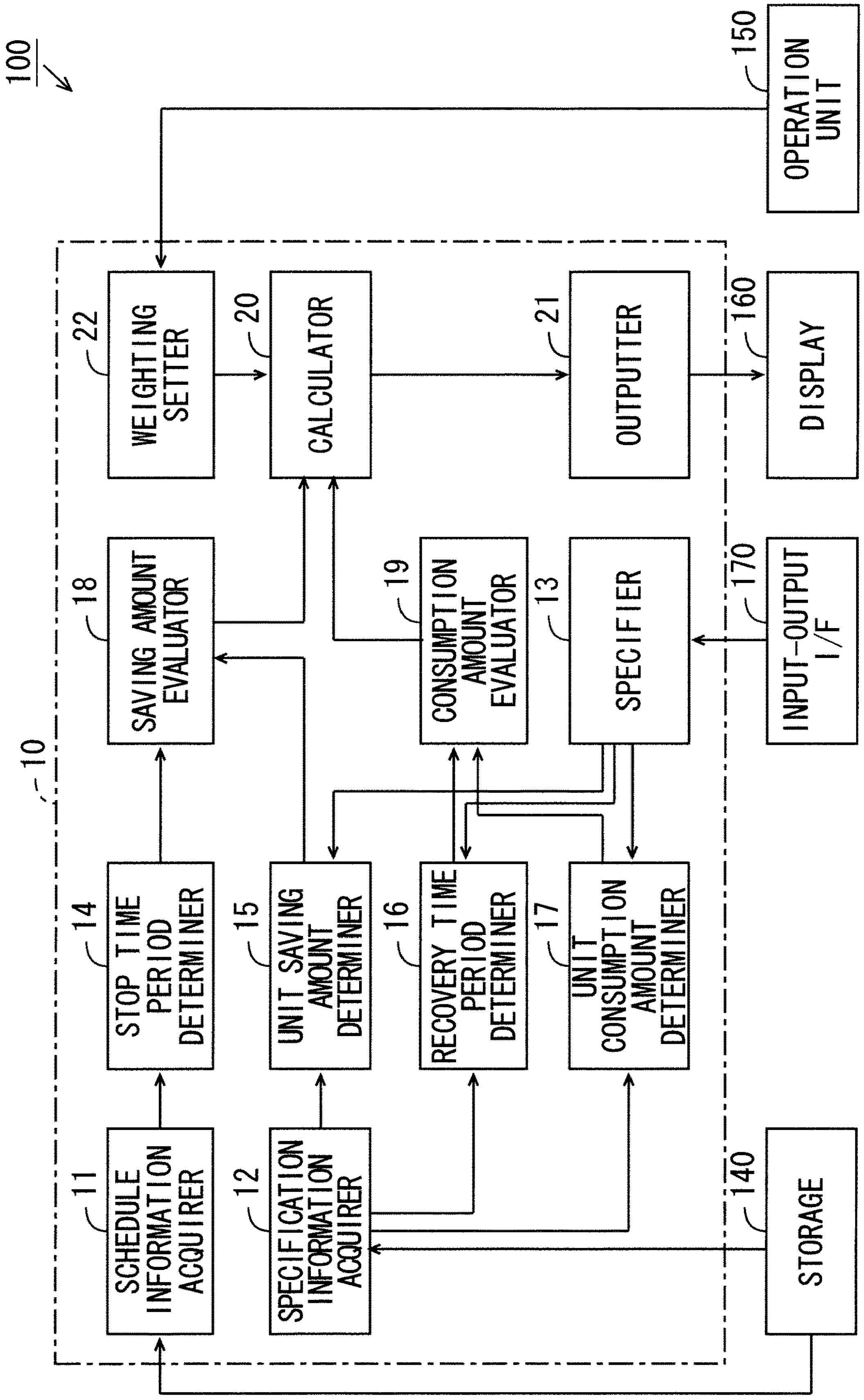
FIG. 8 is a diagram showing the configuration of functions of a GC assistance device according to a modified example.

As such, the GC assistance device 100 may be modified as described below. FIG. 8 is a diagram showing the configuration of functions 10 of a GC assistance device 100 according to a modified example. In regard to the GC assistance device 100 of FIG. 8, differences from the GC assistance device 100 of FIG. 5 will be described below. As shown in FIG. 8, the functions 10 of the GC assistance device 100 further includes a weighting setter 22.

The weighting setter 22 sets weighting in regard to an evaluation value for one of gas and power based on designation made by the user. Here, the supply cost of gas and power varies depending on social conditions. Therefore, in consideration of the supply cost, the user can designate a resource which the user desires to save more sufficiently as a subject for weighting setting. The designation is made by an operation of the operation unit 150, for example. The calculator 20 calculates an evaluation value in regard to the resource by multiplying the comparison result between a resource saving amount and a resource consumption amount for which weighting is set by the weighting setter 22 by a predetermined weighting coefficient.

That is, in a GC assistance process in the modified example, a process of setting weighting in regard to an evaluation value for any one of gas or power executed by the weighting setter 22 earlier than the step S10 is added. In regard to a resource for which weighting is not set, in the step S10, the calculator 20 calculates the result of comparison between the saving amount determined in the step S8 and the consumption amount determined in the step S9 as an evaluation value in regard to the resource.

On the other hand, in regard to a resource for which weighting is set, in the step S10, the calculator 20 calculates a value obtained by multiplication of the result of comparison between the saving amount determined in the step S8 and the consumption amount determined in the step S9 by a predetermined weighting coefficient as an evaluation value in regard to the resource. With this GC assistance process, the user can easily make determination for preferentially saving a desired resource in a case in which an evaluation value for gas and an evaluation value for power do not match.

2. Second Embodiment

(1) Configuration of Analysis System

Figure 9:
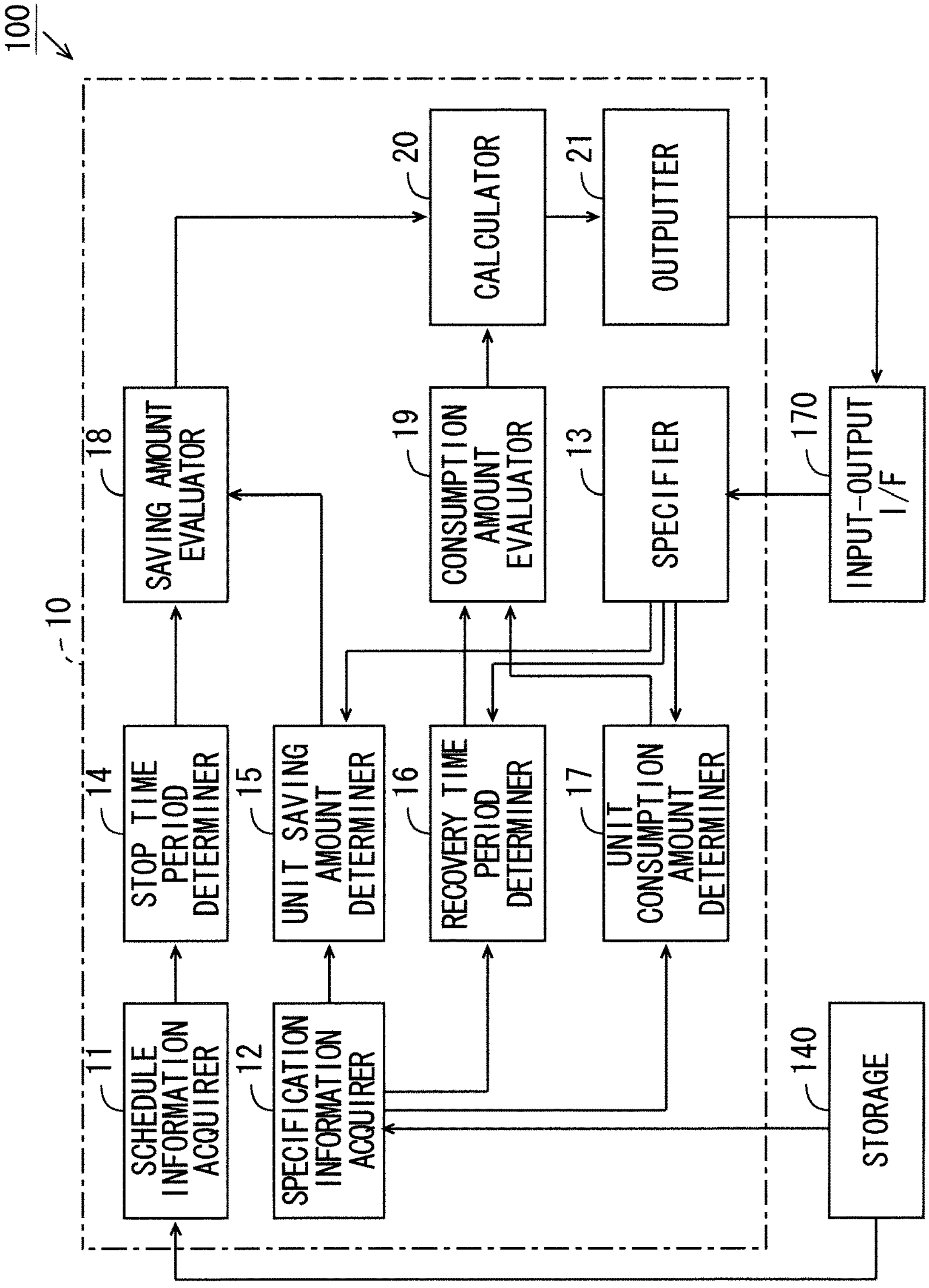
FIG. 9 is a diagram showing the configuration of a GC assistance device according to a second embodiment of the present invention.

In regard to a GC assistance device 100 and a GC assistance method according to a second embodiment, differences from the GC assistance device 100 and the GC assistance method according to the first embodiment will be described. FIG. 9 is a diagram showing the configuration of the GC assistance device 100 according to the second embodiment of the present invention. Also in the present embodiment, the GC assistance device 100 may include the weighting setter 22 similarly to FIG. 8.

As shown in FIG. 9, the outputter 21 is connected to the GC 200 of FIG. 1 via the input-output I/F 170. Further, the outputter 21 controls the operation state of the GC 200 based on an evaluation value calculated by the calculator 20. Specifically, in a case in which the evaluation value calculated by the calculator 20 satisfies a predetermined condition, the outputter 21 brings the GC 200 into the stop state at a start point in time of a predicted stop period of time. With this control, the user does not need to determine whether the GC 200 is to be brought into the stop state. Therefore, the evaluation value calculated by the calculator 20 does not have to be presented to the user.

(2) GC Assistance Process

Figure 10:
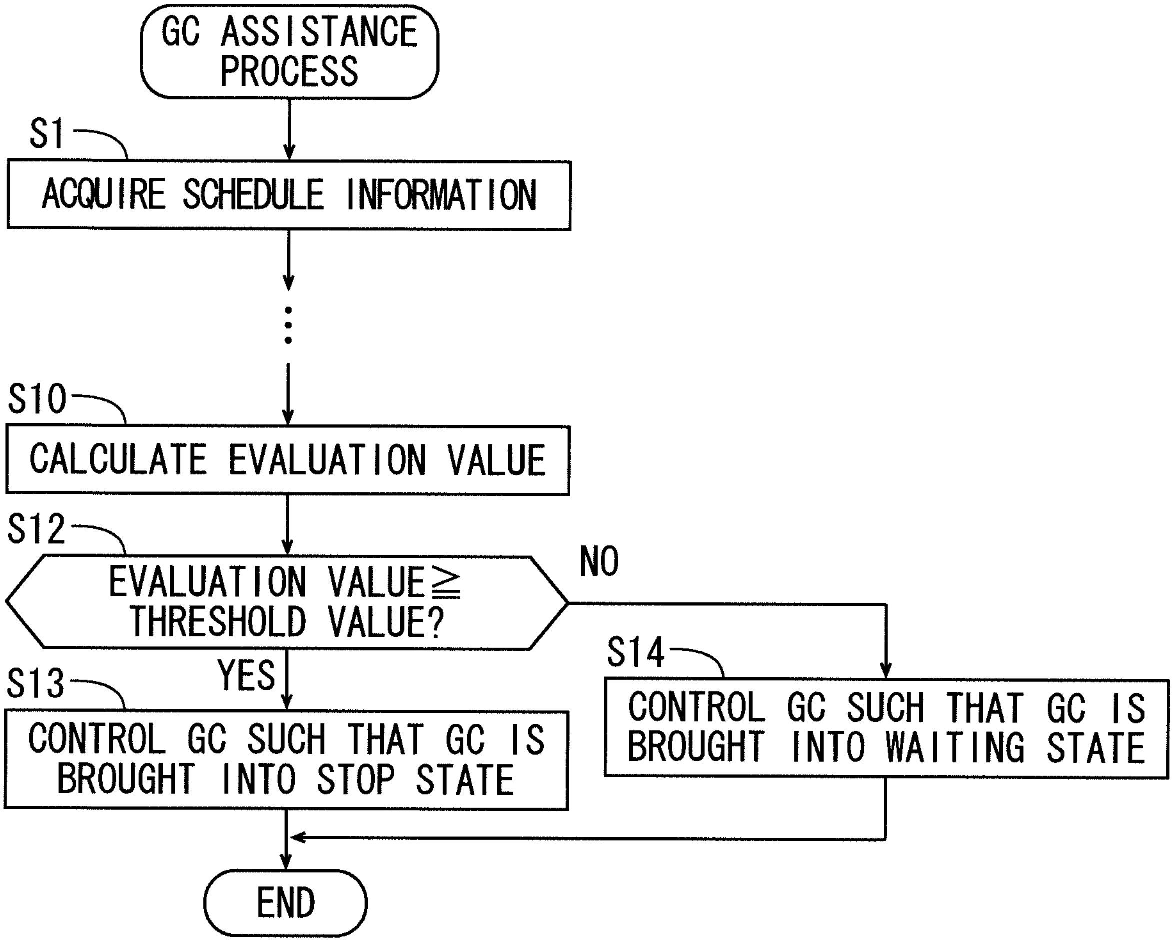
FIG. 10 is a flowchart showing one example of the algorithm of a GC assistance process in the second embodiment.

FIG. 10 is a flowchart showing one example of the algorithm of a GC assistance process in the second embodiment. As shown in FIG. 10, the GC assistance process in the present embodiment includes the steps S12 to S14 instead of the step S11 of the GC assistance process of FIG. 7. Specifically, similarly to the GC assistance process of FIG. 7, the steps S1 to S10 are sequentially performed. After the step S10, the outputter 21 determines whether an evaluation value calculated in the step S10 is equal to or larger than a predetermined threshold value (step S12).

In a case in which the evaluation value is equal to or larger than the threshold value, a resource consumption amount is reduced by the stop state of the GC 200. In this case, the outputter 21 controls the GC 200 such that the GC is brought into the stop state at a predetermined point in time (step S13) and ends the GC assistance process. On the other hand, in a case in which the evaluation value is smaller than the threshold value, a resource consumption amount is increased by the stop state of the GC 200. In this case, the outputter 21 controls the GC 200 such that the GC 200 is brought into the waiting state at a predetermined point in time (step S14) and ends the GC assistance process.

(3) Effects

In the GC assistance device 100 according to the present embodiment, a resource saving amount caused by stopping of the GC 200 is evaluated by the saving amount evaluator 18. The resource consumption amount caused by recovery of the GC 200 from the stop state is evaluated by the consumption amount evaluator 19. An operation state of the GC 200 is automatically controlled by the outputter 21 based on an evaluation value in regard to the saving amount and the consumption amount. Thus, the resource consumption amount in the GC 200 can be reduced.

Specifically, in a case in which the evaluation value calculated by the calculator 20 satisfies a predetermined condition, the GC 200 is brought into the stop state by the outputter 21. In this case, the resource consumption amount in the GC 200 can be reduced by simple control.

3. Other Embodiments (1) In the above-mentioned embodiment, a predicted stop period of time is determined based on schedule information acquired by the schedule information acquirer 11. Further, a predicted recovery period of time, a unit saving amount and a unit consumption amount are determined based on a constituent element included in the GC 200 specified by the specifier 13 and the specification information representing the specification of the constituent element acquired by the specification information acquirer 12. However, the embodiment is not limited to this.

At least part of a predicted stop period of time, a predicted recovery period of time, a unit saving amount and a unit consumption amount may be set in advance as a prescribed value. Alternatively, a predicted stop period of time may be determined based on a stop period of time of the GC 200 recorded in the past or its statistical value. Similarly, a predicted recovery period of time may be determined based on a recovery period of time of the GC 200 recorded in the past or its statistical value. In these cases, the GC assistance device 100 does not have to include part or all of the schedule information acquirer 11, the specification information acquirer 12 and the specifier 13.

Figure 11:
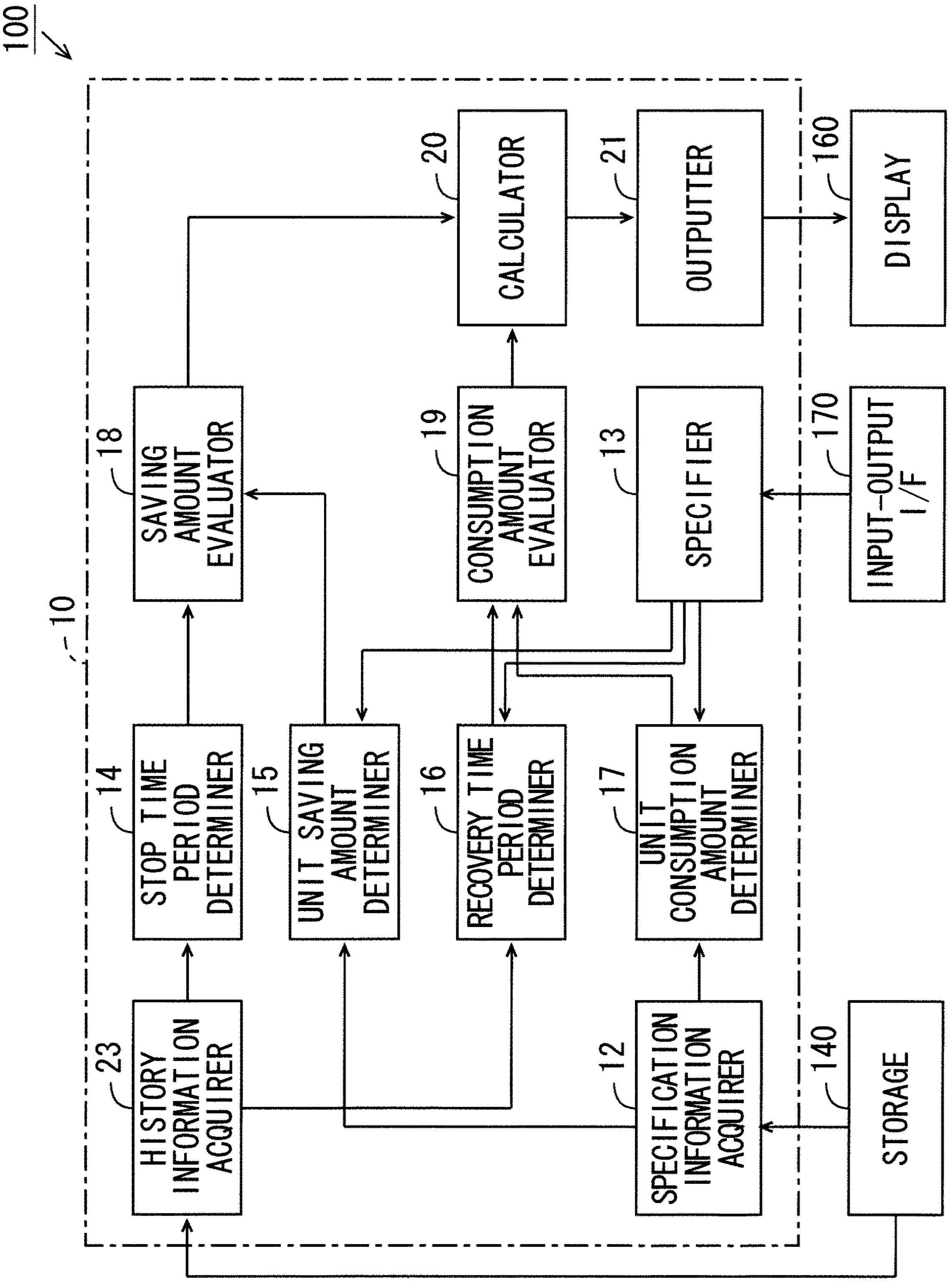
FIG. 11 is a diagram showing the configuration of a GC assistance device according to another embodiment.

FIG. 11 is a diagram showing the configuration of a GC assistance device 100 according to another embodiment. In regard to the GC assistance device 100 of FIG. 1, differences from the GC assistance device 100 of FIG. 5 will be described below. As shown in FIG. 11, the GC assistance device 100 according to the present embodiment includes a history information acquirer 23 instead of the schedule information acquirer 11. Further, the storage 140 stores history information representing the operation history of the GC 200. The operation history includes a past stop period of time and a past recovery period of time of the GC 200. The history information may be stored not in the storage 140 but in another storage device.

The history information acquirer 23 acquires history information stored in the storage 140 or the like. The stop time period determiner 14 determines a predicted stop period of time based on a past stop period of time of the GC 200 in the history information acquired by the history information acquirer 23. In this case, the predicted stop period of time can be easily determined based on the past stop period of time of the GC 200. The recovery time period determiner 16 determines a predicted recovery period of time based on a past recovery period of time of the GC 200 in the history information acquired by the history information acquirer 23. In this case, the predicted recovery period of time can be easily determined based on the past recovery period of time of the GC 200.

Further, when the GC 200 is recovered, the stability of the GC 200 (the stability of a signal output by the detector 250, for example) may be measured. Further, a period of time required for the stability of the GC 200 to be constant may be measured as a recovery period of time of the GC 200. Furthermore, a past recovery period of time of the GC 200 stored in the storage 140 or the like may be updated based on a measured recovery period of time. In this case, it is possible to more accurately determine a predicted recovery period of time based on the most recent recovery period of time of the GC 200.

Also in the GC assistance device 100 according to the present embodiment, the functions 10 may include the weighting setter 22 similarly to the GC assistance device 100 of FIG. 8. Further, similarly to the second embodiment, the operation state of the GC 200 may be automatically controlled by the outputter 21 based on an evaluation value in regard to a saving amount and a consumption amount.

(2) While evaluation values are calculated for both of gas and power in the above-mentioned embodiment, the embodiment is not limited to this. In a case in which it is not desired that gas is to be saved, only an evaluation value for power may be calculated and an evaluation value for gas does not have to be calculated. Alternatively, in a case in which it is not desired that power is to be saved, only an evaluation value for gas may be calculated, and an evaluation value for power does not have to be calculated.

(3) While the result of comparison between a saving amount evaluated by the saving amount evaluator 18 and a consumption amount evaluated by the consumption amount evaluator 19 is used as an evaluation value in the first embodiment, the embodiment is not limited to this. Each of the saving amount and the consumption amount may be used as an evaluation value. In this case, the saving amount and the evaluation value may be presented to the user in a comparable manner, and the GC assistance device 100 does not have to include the calculator 20.

4. Aspects

It is understood by those skilled in the art that the plurality of above-mentioned illustrative embodiments are specific examples of the below-mentioned aspects.

(Item 1) A gas chromatograph assistance device according to one aspect that is used together with a gas chromatograph may include a saving amount evaluator that evaluates a saving amount of a resource caused by stopping of the gas chromatograph, a consumption amount evaluator that evaluates a consumption amount of the resource caused by recovery of the gas chromatograph from a stop state, and an outputter that presents an evaluation value in regard to the saving amount and the consumption amount to a user or controls an operation state of the gas chromatograph based on the evaluation value.

With this configuration, the user can easily determine whether the resource is to be saved when the gas chromatograph is brought into the stop state by identifying the evaluation value presented by the outputter. Alternatively, the operation state of the gas chromatograph is automatically controlled by the outputter based on the evaluation value. Thus, the resource consumption amount in the gas chromatograph can be reduced.

(Item 2) The gas chromatograph assistance device according to item 1, may further include a calculator that calculates a result of comparison between the saving amount and the consumption amount as the evaluation value.

In this case, an increase or decrease in resource consumption amount caused by stopping of the gas chromatograph is indicated by the evaluation value. Thus, it is possible to more easily determine whether the resource is to be saved by stopping of the gas chromatograph.

(Item 3) The gas chromatograph assistance device according to item 2, wherein the outputter may bring the gas chromatograph into the stop state in a case in which the evaluation value calculated by the calculator satisfies a predetermined condition.

In this case, the resource consumption amount in the gas chromatograph can be reduced by simple control.

(Item 4) The gas chromatograph assistance device according to item 2 or 3, may further include a weighting setter that sets weighting for the evaluation value in regard to any one of a first resource and a second resource of the resource based on designation made by the user.

With this configuration, in a case in which the evaluation value for the first resource and the evaluation value for the second resource do not match, the user can easily make determination for preferentially saving a desired resource.

(Item 5) The gas chromatograph assistance device according to any one of items 1 to 4, may further include a stop time period determiner that determines a predicted stop period of time of the gas chromatograph, and a unit saving amount determiner that determines a saving amount of the resource per unit time in the gas chromatograph as a unit saving amount, wherein the saving amount evaluator may evaluate the saving amount based on the predicated stop period of time and the unit saving amount.

In this case, it is possible to easily evaluate the resource saving amount caused by stopping of the gas chromatograph.

(Item 6) The gas chromatograph assistance device according to item 5, further include a schedule information acquirer that acquires schedule information representing a schedule of the user of the gas chromatograph, wherein the stop time period determiner may determine the predicted stop period of time based on the schedule information.

In this case, it is possible to determine the predicted stop period of time based on the user's schedule.

(Item 7) The gas chromatograph assistance device according to item 6, may further include a specifier that specifies a constituent element included in the gas chromatograph, and a specification information acquirer that acquires specification information representing specification of the constituent element, wherein the stop time period determiner may determine the predicted stop period of time further based on the constituent element and the specification information.

In this case, it is possible to more accurately determine the predicted stop period of time based on the specification of the constituent element included in the gas chromatograph.

(Item 8) The gas chromatograph assistance device according to any one of items 5 to 7 may further include a history information acquirer that acquires history information representing operation history of the gas chromatograph, wherein the stop time period determiner may determine the predicated stop period of time based on a past stop period of time of the gas chromatograph in the history information.

In this case, it is possible to easily determine the predicted stop period of time based on the past stop period of time of the gas chromatograph.

(Item 9) The gas chromatograph assistance device according to any one of items 5 to 8, may further include a specifier that specifies a constituent element included in the gas chromatograph, and a specification information acquirer that acquires specification information representing specification of the constituent element, wherein the unit saving amount determiner may determine the unit saving amount based on the constituent element and the specification information.

In this case, it is possible to easily determine the unit saving amount based on the specification of the constituent element included in the gas chromatograph.

(Item 10) The gas chromatograph assistance device according to any one of items 1 to 9, may further include a recovery time period determiner that determines a predicted recovery period of time of the gas chromatograph, and a unit consumption amount determiner that determines a consumption amount of the resource per unit time in the gas chromatograph as a unit consumption amount, wherein the consumption amount evaluator may evaluate the consumption amount based on the predicated recovery period of time and the unit consumption amount.

In this case, it is possible to easily evaluate the resource consumption amount caused by recovery of the gas chromatograph from the stop state.

(Item 11) The gas chromatograph assistance device according to item 10, may further include a specifier that specifies a constituent element included in the gas chromatograph, and a specification information acquirer that acquires specification information representing specification of the constituent element, wherein the recovery time period determiner may determine the predicted recovery period of time based on the constituent element and the specification information.

In this case, it is possible to easily determine the predicted recovery period of time based on the specification of the constituent element included in the gas chromatograph.

(Item 12) The gas chromatograph assistance device according to item 10 or 11, may further include a history information acquirer that acquires history information representing operation history of the gas chromatograph, wherein the recovery time period determiner may determine the predicted recovery period of time based on a past recovery period of time of the gas chromatograph in the history information.

In this case, it is possible to easily determine the predicted recovery period of time based on the past recovery period of time of the gas chromatograph.

(Item 13) The gas chromatograph assistance device according to any one of items 10 to 12, may further include a specifier that specifies a constituent element included in the gas chromatograph, and a specification information acquirer that acquires specification information representing specification of the constituent element, wherein the unit consumption amount determiner may determine the unit consumption amount based on the constituent element and the specification information.

In this case, it is possible to easily determine the unit consumption amount based on the specification of the constituent element included in the gas chromatograph.

(Item 14) A gas chromatograph assistance method according to another aspect, of assisting use of a gas chromatograph, which may be performed by a computer, may include evaluating a saving amount of a resource caused by stopping of the gas chromatograph, evaluating a consumption amount of the resource caused by recovery of the gas chromatograph from a stop state, and presenting an evaluation value in regard to the saving amount and the consumption amount to a user or controlling an operation state of the gas chromatograph based on the evaluation value.

With this configuration, the user can easily determine whether the resource is to be saved when the gas chromatograph is brought into the stop state by identifying the presented evaluation value. Alternatively, the operation state of the gas chromatograph is automatically controlled based on the evaluation value. Thus, it is possible to reduce the resource consumption amount in the gas chromatograph.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A gas chromatograph assistance device that is used together with a gas chromatograph, comprising:

a stop time period determiner that determines a predicted stop period of time of the gas chromatograph;

a unit saving amount determiner that determines a saving amount of a resource per unit time in the gas chromatograph as a unit saving amount;

a saving amount evaluator that evaluates the saving amount of the resource caused by stopping of the gas chromatograph based on the predicted stop period of time and the unit saving amount;

a consumption amount evaluator that evaluates a consumption amount of the resource caused by recovery of the gas chromatograph from a stop state; and an outputter that presents an evaluation value in regard to the saving amount and the consumption amount to a user or controls an operation state of the gas chromatograph based on the evaluation value.

2. The gas chromatograph assistance device according to claim 1, further comprising a calculator that calculates a result of comparison between the saving amount and the consumption amount as the evaluation value.

3. The gas chromatograph assistance device according to claim 2, wherein the outputter brings the gas chromatograph into the stop state in a case in which the evaluation value calculated by the calculator satisfies a predetermined condition.

4. The gas chromatograph assistance device according to claim 2, further comprising a weighting setter that sets weighting for the evaluation value in regard to any one of a first resource and a second resource of the resource based on designation made by the user.

5. The gas chromatograph assistance device according to claim 1, further comprising a schedule information acquirer that acquires schedule information representing a schedule of the user of the gas chromatograph, wherein the stop time period determiner determines the predicted stop period of time based on the schedule information.

6. The gas chromatograph assistance device according to claim 5, further comprising:

a specifier that specifies a constituent element included in the gas chromatograph; and a specification information acquirer that acquires specification information representing specification of the constituent element, wherein the stop time period determiner determines the predicted stop period of time further based on the constituent element and the specification information.

7. The gas chromatograph assistance device according to claim 1, further comprising a history information acquirer that acquires history information representing operation history of the gas chromatograph, wherein the stop time period determiner determines the predicted stop period of time based on a past stop period of time of the gas chromatograph in the history information.

8. The gas chromatograph assistance device according to claim 1, further comprising:

a specifier that specifies a constituent element included in the gas chromatograph; and a specification information acquirer that acquires specification information representing specification of the constituent element, wherein the unit saving amount determiner determines the unit saving amount based on the constituent element and the specification information.

9. The gas chromatograph assistance device according to claim 1, further comprising:

a recovery time period determiner that determines a predicted recovery period of time of the gas chromatograph; and a unit consumption amount determiner that determines a consumption amount of the resource per unit time in the gas chromatograph as a unit consumption amount, wherein the consumption amount evaluator evaluates the consumption amount based on the predicted recovery period of time and the unit consumption amount.

10. The gas chromatograph assistance device according to claim 9, further comprising:

a specifier that specifies a constituent element included in the gas chromatograph; and a specification information acquirer that acquires specification information representing specification of the constituent element, wherein the recovery time period determiner determines the predicted recovery period of time based on the constituent element and the specification information.

11. The gas chromatograph assistance device according to claim 9, further comprising a history information acquirer that acquires history information representing operation history of the gas chromatograph, wherein the recovery time period determiner determines the predicted recovery period of time based on a past recovery period of time of the gas chromatograph in the history information.

12. The gas chromatograph assistance device according to claim 9, further comprising:

a specifier that specifies a constituent element included in the gas chromatograph; and a specification information acquirer that acquires specification information representing specification of the constituent element, wherein the unit consumption amount determiner determines the unit consumption amount based on the constituent element and the specification information.

13. A gas chromatograph assistance method, of assisting use of a gas chromatograph, which is performed by a computer, including:

determining a predicted stop period of time of the gas chromatograph;

determining a saving amount of a resource per unit time in the gas chromatograph as a unit saving amount;

evaluating the saving amount of the resource caused by stopping of the gas chromatograph based on the predicted stop period of time and the unit saving amount;

evaluating a consumption amount of the resource caused by recovery of the gas chromatograph from a stop state; and presenting an evaluation value in regard to the saving amount and the consumption amount to a user or controlling an operation state of the gas chromatograph based on the evaluation value.

* * * * *